(12) United States Patent
Morita

(10) Patent No.: US 6,857,174 B2
(45) Date of Patent: Feb. 22, 2005

(54) ROBOT HAND FOR HIGH LOAD WORK

(75) Inventor: Hiroyuki Morita, Kariya (JP)

(73) Assignee: DENSO Corporation, Kariya (JP)

( * ) Notice: Subject to any disclaimer, the term of this patent is extended or adjusted under 35 U.S.C. 154(b) by 93 days.

(21) Appl. No.: 10/341,943

(22) Filed: Jan. 14, 2003

(65) Prior Publication Data
US 2003/0131459 A1 Jul. 17, 2003

(30) Foreign Application Priority Data

Jan. 15, 2002 (JP) .......................... 2002-006089
Jan. 15, 2002 (JP) .......................... 2002-006151

(51) Int. Cl.$^7$ .......................... B23P 19/04; B21K 5/00
(52) U.S. Cl. .......................... 29/240; 29/242
(58) Field of Search .......................... 29/242, 700, 717, 29/718, 240, 281.1, 281.5; 411/14.5; 901/41, 27, 19

(56) References Cited

U.S. PATENT DOCUMENTS 4,145,802 A * 3/1979 d'Auria .......................... 483/32
4,310,958 A * 1/1982 Balaud et al. .............. 29/26 A

FOREIGN PATENT DOCUMENTS

JP       A-7-171643        7/1995
JP       A-2000-296421    10/2000

* cited by examiner

Primary Examiner—John C. Hong
(74) Attorney, Agent, or Firm—Harness, Dickey & Pierce, PLC

(57) ABSTRACT

High load screwing work, calking work, or press-fitting work ancillary to assembly work can be performed by a low rigidity robot such as a tabletop robot by, in the screwing work, returning the torque applied to one of the bolt and nut from a rotation drive unit such as a motor and reduction gear to the casing part of the rotation drive unit through a relative rotation inhibiting mechanism supporting the other and, in the calking work or press-fitting work, returning the action force applied from a driving means such as an air cylinder to the calking punch etc. to the casing part of the driving means through the workpiece and grip parts. Therefore, the path of transmission of the torque or action force is kept inside the robot hand and does not leak to the outside.

8 Claims, 16 Drawing Sheets

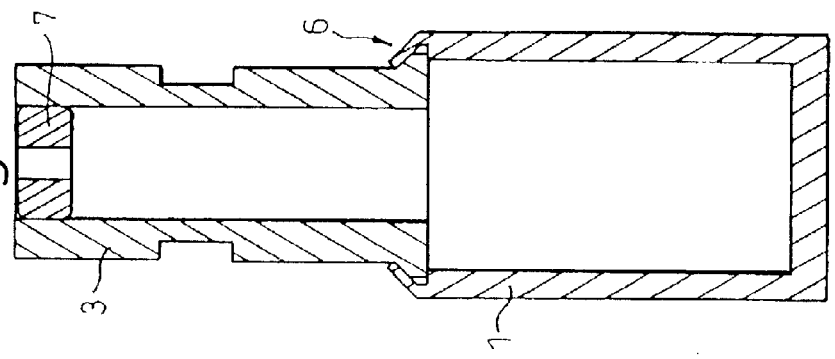
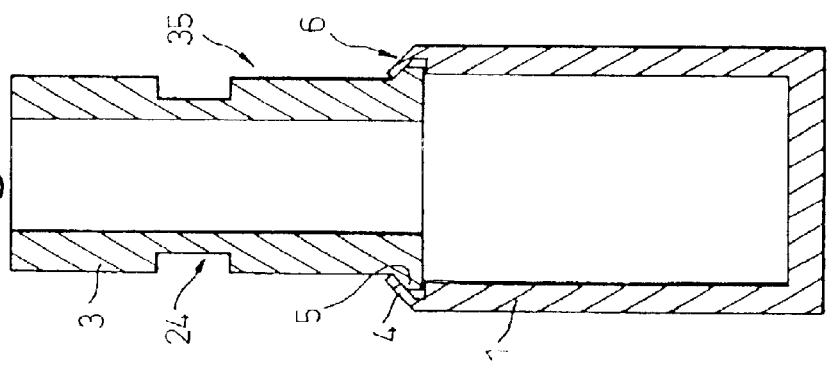
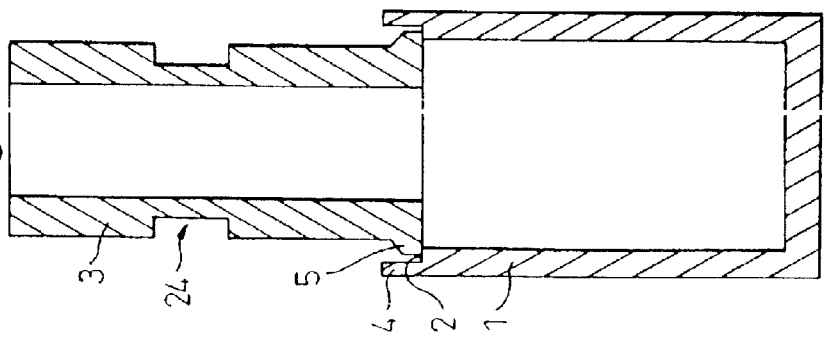

ROBOT HAND FOR HIGH LOAD WORK

BACKGROUND OF THE INVENTION

1. Field of the Invention

The present invention relates to a robot hand for high load work, more particularly relates to a robot hand able to perform high load screwing work or high load calking work or press-fitting work when using a small tabletop robot for assembly work.

2. Description of the Related Art

As a first related art, Japanese Unexamined Patent Publication (Kokai) No. 7-171643 discloses an industrial robot hand using an air cylinder supported by a frame of a robot hand to drive a hammer and strike part of a thick steel plate formed in advance with a part cut along a target shape so as to punch out the target part of the steel plate, where, so as to raise the effect of striking and reduce the number of strikes and so as to prevent the reaction force occurring due to the striking action of the hammer from being transmitted to the robot arm supporting the robot hand, electromagnets able to hold the steel plate are used to affix the steel plate to the frame of the robot hand and shock absorbing springs are attached to the parts connecting the frame to the robot arm.

Further, as a second related art, Japanese Unexamined Patent Publication (Kokai) No. 2000-296421 discloses a system enabling simultaneous machining such as drilling by a drill supported by a robot arm on a line performing plasma processing or laser processing by attaching to a mounting base supported at a front end of the robot arm not only a working tool for the machining, but also a holding tool, and holding a workpiece by the holding tool so as have the reaction force of the working force be received by both the workpiece and the holding tool and thereby enable high accuracy machining. As examples of a holding tool in this case, it discloses to use electromagnets or a vacuum suction holding device for holding the workpiece or a hook mechanism for mechanically engaging with the workpiece.

The above first related art relates to work for punching out a piece of a steel plate by the striking action of a hammer, while the second related art illustrates the work of drilling a hole in a steel plate by a drill, so these disclosed related art can be said to be related to the work of forming holes. Therefore, only naturally, even if these related art were applied to a robot hand for screwing work, which is completely different work from hole-forming work, it would not be possible to have the torque occurring due to the screwing and the reaction torque be canceled out inside the robot hand and prevent the transmission of torque to the robot arm, robot base, etc. If not able to cancel out the large torque occurring due to screwing inside the robot hand, the torque would be transmitted to the structural parts of the robot body and cause those parts to elastically deform, so if the main structure is low in rigidity, the position of the robot hand could no longer be accurately controlled.

Further, since the above-mentioned first related art and second related art both relate to work for forming holes, even if these related art were applied to a robot hand for calking work or press-fitting work, which again are completely different from hole-forming work, it would not be possible to have the action force for such work and the reaction force occurring due to this be canceled out inside the robot hand and prevent the transmission of the action force to the robot arm or robot base etc. If not able to cancel out the large action force applied for the calking work or press-fitting work inside the robot hand, the action force would be transmitted to the structural parts of the robot body and cause those parts to elastically deform, so the same problem as with the above screwing work would arise.

Generally speaking, screwing work, calking work, and press-fitting work fall under the category of high load work, so to prevent position control of the robot hand from being impaired even if a large torque due to the screwing work or a large action force due to the calking work or press-fitting work is transmitted to the robot body, it becomes necessary to use a large sized robot system having a robot arm, robot base, etc. having an extremely high rigidity. Therefore, when using a small-sized robot system such as a tabletop robot designed for assembly work of auto parts so as to perform screwing work, calking work, or press-fitting work along with part assembly work, the large torque or action force due to these high load work would act on the robot arm or other low rigidity parts to cause them to elastically deform, so the accuracy of positioning of the robot hand would drop. Therefore, a low rigidity robot system generally cannot be used to reliably perform screwing work, calking work, or press-fitting work as ancillary work in an assembly process etc.

Further, in the above-mentioned two related art, the workpiece is mainly held by the action of electromagnets, but when the workpiece is a nonmagnetic metal material or plastic material often used in auto parts, the electromagnetic means of holding the workpiece is ineffective. Therefore, in this sense as well, it can be said to be impossible to apply the above related art to screwing work, calking work, or press-fitting work.

SUMMARY OF THE INVENTION

An object of the present invention is to provide a robot hand able to perform high load work which can reliably perform screwing, calking, or press-fitting while maintaining a high accuracy of position control of the robot hand by being configured so that when a small-sized robot system having a robot arm or robot base of a low rigidity such as a tabletop robot is used to perform screwing work, calking work, or press-fitting work as ancillary work in the process of assembling parts, the large torque or reaction torque or action force or reaction force is not transmitted to the robot side even without raising the rigidity of the robot system as a whole including the robot arm, robot base, etc.

Accordingly, another object of the present invention is to extend the range of work able to be performed by a small-sized, not high rigidity, inexpensive robot system such as a tabletop robot to include screwing work, calking work, and press-fitting work generally speaking falling under the category of high load work.

A still further object of the present invention is to provide a novel means for canceling out torque or an action force in a robot hand performing such screwing work, calking work, or press-fitting work which can be used without problem no matter what solid material other than a magnetic material the bolt, nut, or other screw member to be fastened, the pallet etc. supporting the same, or the members forming the workpiece in the calking work or press-fitting are made of.

The present invention provides a robot hand for screwing work having the following configuration as one means for achieving the above objects.

According to a first aspect of the present invention, there is provided a robot hand for screwing work provided with a rotation driving means including a motor, reduction gear, etc. for driving rotation of at least one of a male screw member and female screw member, a supporting means connected with a flange-like end of a robot arm of a robot body for supporting the rotation driving means, a holding means for holding a screw member to be screwed at a predetermined stationary position of the robot body, and a relative rotation inhibiting mechanism for connecting the supporting means and holding means at the time of screwing and inhibiting relative rotation between the two.

Therefore, the screwing torque acting when one of the screw members is screwed with the other by the action of the rotation driving means is returned from the holding means through the relative rotation inhibiting mechanism to the supporting means of the rotation driving means, so the path of transmission of the torque is kept inside the robot hand and the amount of torque leaked to the outside becomes small. As a result, even if the structural parts of the robot body are not sufficiently large in rigidity, the problem of the torque leaked from the robot hand to the robot body elastically deforming parts of the robot body such as the robot arm, support columns, and robot base, the accuracy of control of the position of the robot hand falling, and normal screwing becoming impossible is avoided. Therefore, it becomes possible to use a small-sized, low rigidity tabletop robot etc. for high load screwing work.

In this robot hand for screwing work, if further provision is made of a means for loosely attaching the holding means for the screw member to be screwed and a stationary part of the robot body facing the same, the holding means will be moved accompanyingly in the range of play of the loose attaching means when a screwing torque is applied and all of the torque will be returned to the supporting means of the rotation driving means through the relative rotation inhibiting mechanism, so the amount of the torque leaked from the holding means to the robot body side will become substantially zero. Therefore, the effect of the present invention explained above will be exhibited to the maximum extent.

Further, in this robot hand for screwing work, if provision is made of a shock absorbing means such as rubber or a spring between the flange-like end of the robot arm and supporting means of the rotation driving means in the robot hand, the shock absorbing means will be able to prevent the inertia torque or inertia force occurring when the magnitude of the screwing torque or other load force rapidly changes from being transmitted directly from the robot hand to the robot body. Therefore, even when the structural parts of the robot body are low in rigidity, it will be possible to prevent the shock-like inertia torque or inertia force from elastically deforming the structural parts of the robot body, so it will be possible to maintain a high accuracy of control of the robot body and reliably perform screwing work.

The present invention further provides a robot hand for high load work having the following configuration and actions as another means for achieving the above objects.

According to a second aspect of the present invention, there is provided a robot hand for high load work designed to integrally join a first member and a second member by either calking work or press-fitting work, provided with a connecting part such as a plate connected to a flange-like end of a robot arm of a robot body, a driving means such as an air cylinder attached to the connecting part by a casing part, a punch attached to a piston-like output end of the driving means for biasing the first member toward the second member, and a holding means such as grip parts or a supporting part for holding the second member facing the punch by being directly or indirectly supported by the casing part of the driving means. The action force acting when the punch driven by the action of the driving means biases the first member toward the second member is returned through the holding means to the casing part of the driving means.

Therefore, the path of transmission of the action force is kept in the robot hand and the action force will no longer leak to the outside of the robot hand, so even if the structural parts of the robot body are not sufficiently large in rigidity, the problem of the action force leaking from the robot hand to the robot body side elastically deforming parts of the robot body such as the robot arm, support columns, and robot base, the accuracy of control of the position of the robot hand falling, and thereby normal calking work or press-fitting work becoming impossible is avoided. Therefore, it becomes possible to use a small-sized, low rigidity tabletop robot etc. for high load calking work or press-fitting work.

In this aspect of the present invention, if provision is made of a shock absorbing means such as rubber or a spring between a flange-like end of the robot arm and the plate-like connecting part at the robot hand, the shock absorbing means will be able to prevent the inertia force occurring when the magnitude of the action force etc. rapidly changes from being transmitted directly from the robot hand to the robot body. Therefore, even when the structural parts of the robot body are low in rigidity, it will be possible to prevent the shock-like inertia force from elastically deforming the structural parts of the robot body, so it will be possible to maintain a high accuracy of control of the robot body and reliably perform calking work or press-fitting work.

In the robot hand for high load work according to the present invention, it is possible to cause the first member to be moved while held by suction at the related part of the driving means by a vacuum suction holding means when transporting the first member to the position of the second member. When using such a means, the member to be moved is not limited to a magnetic material and can be transported without any problem at all even if any other material such a nonmagnetic metal material, plastic, etc.

BRIEF DESCRIPTION OF THE DRAWINGS

These and other objects and features of the present invention will become clearer from the following description of the preferred embodiments given with reference to the attached drawings, wherein:

FIGS. 4A, 4B, and 4C are longitudinal sectional views of the states of completion after preparatory work, calking work, and the following press-fitting work;

DESCRIPTION OF THE PREFERRED EMBODIMENTS

Preferred embodiments of the present invention will be described in detail below while referring to the attached figures.

Figure 1:
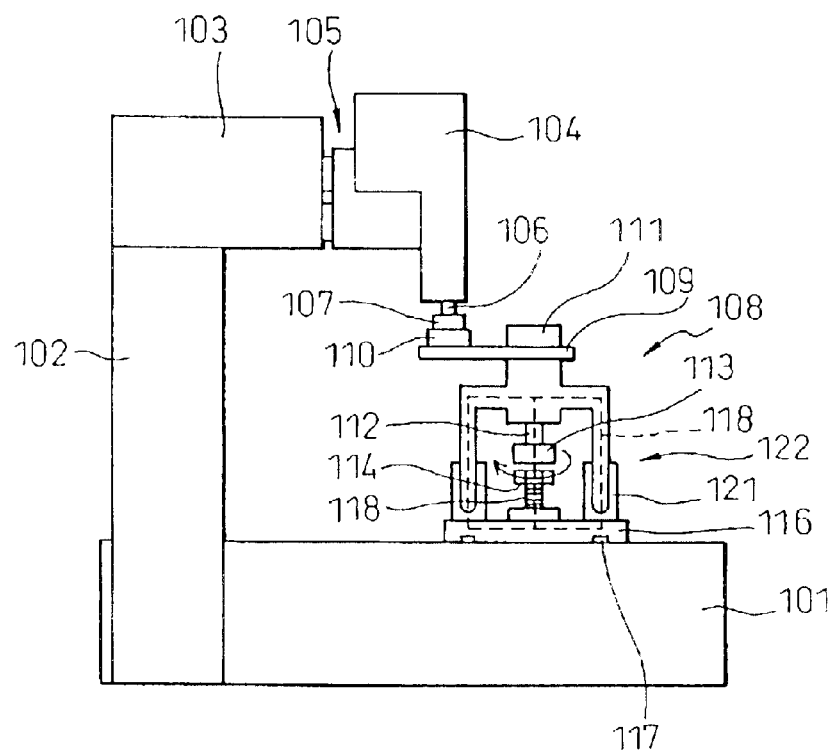
FIG. 1 is a front view schematically illustrating the overall configuration of a robot system including a robot hand for screwing work.
Figure 2:
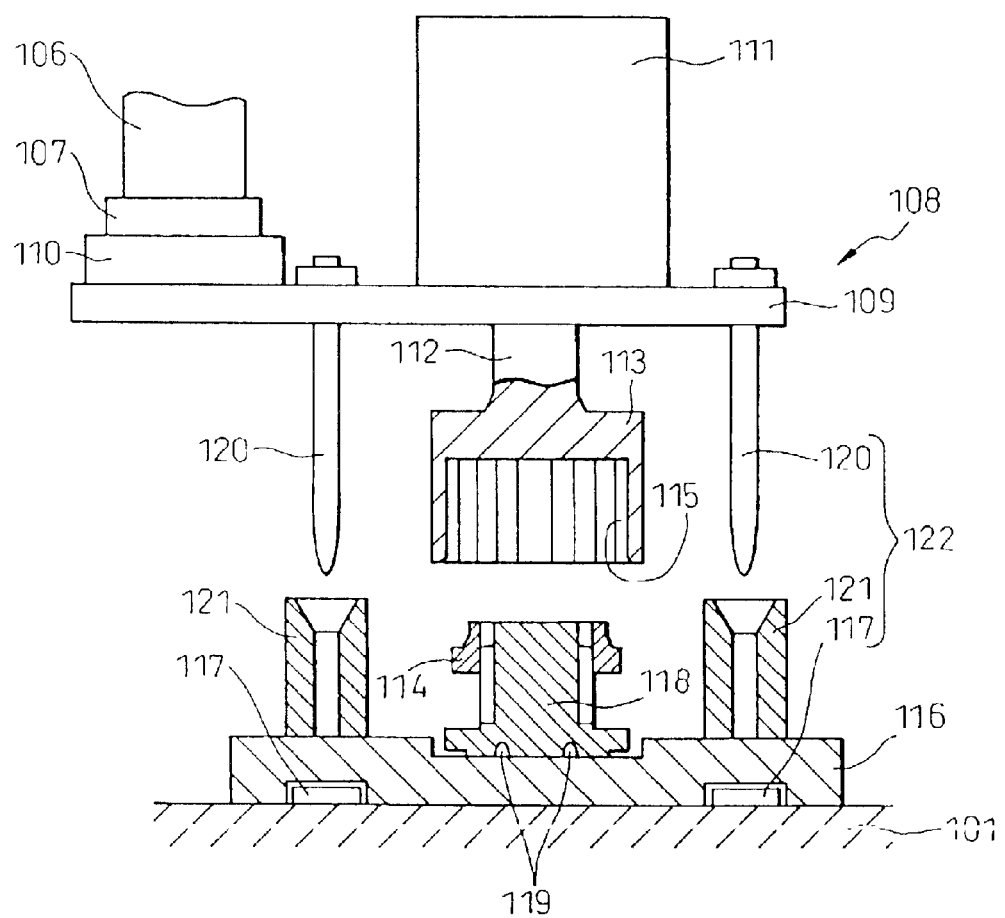
FIG. 2 is a front view showing by a partial sectional view the state of the robot hand and pallet side before a relative rotation inhibiting mechanism is engaged.
Figure 3:
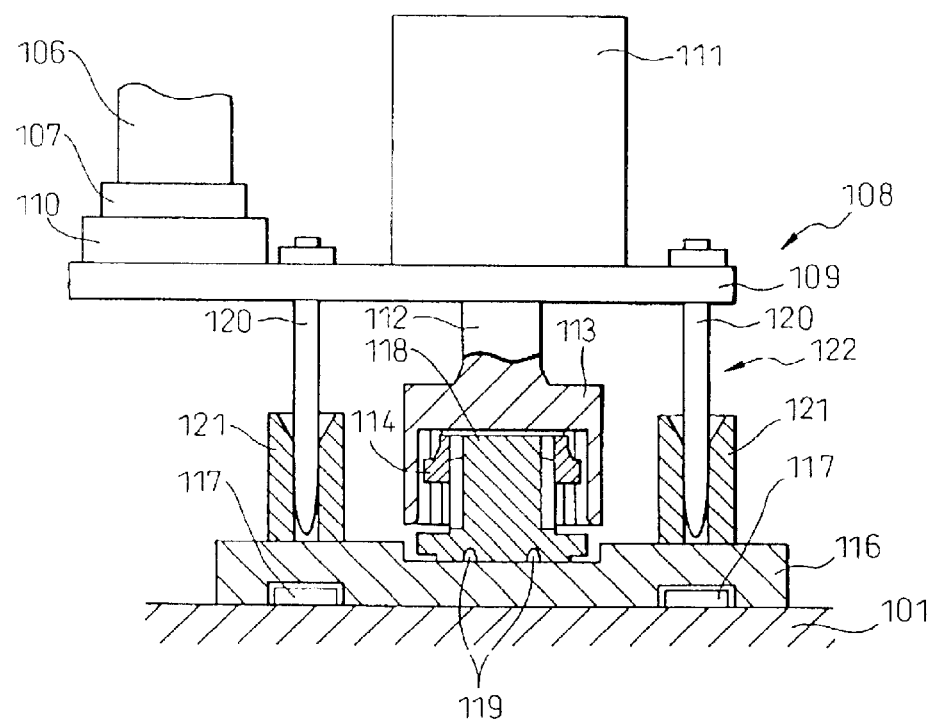
FIG. 3 is a front view showing by a partial sectional view the state of the robot hand and pallet side after the relative rotation inhibiting mechanism is engaged.

First, a first embodiment of the present invention will be explained in detail with reference to the attached FIG. 1 to FIG. 3. FIG. 1 schematically shows the configuration of the overall system of a small-sized tabletop robot using the present invention for use in screwing work as ancillary work in the process of assembly of an auto part. Reference numeral 101 shows a robot base serving as the base of the robot system as a whole, 102 two support columns standing vertically from the two sides of the robot base 101, 103 a beam part long in the horizontal direction (direction perpendicular to paper surface) attached so as to bridge the top ends of the two support columns 102, 104 a first arm able to move in the horizontal direction along the beam part 103, and 105 a horizontal direction sliding mechanism provided between the first arm 104 and beam part 103.

A shaft 106 projecting from the first arm 104 downward forms what may be called a second arm. The shaft 106 is designed to not only be able to rotate with respect to the first arm 104, but also to change in projecting length by expansion/contraction in its axial direction. Reference numeral 107 shows a flange serving as an output end of the robot. The flange 107 forms a connecting part with the robot hand (shown by reference numeral 108) for the screwing work in the first embodiment. Note that a drive mechanism, control device, etc. for operating the flange 107 through the first arm 104 or shaft 106 are housed inside the above-mentioned robot base 101, support columns 102, beam part 103, or first arm 104 and sliding mechanism 105 themselves.

The robot hand 108 in the first embodiment is for performing screwing work as ancillary work in an assembly process. Its detailed structure is shown in FIG. 2 and FIG. 3. Compared with FIG. 1, which is deformed slightly since it is a conceptual view, there are some parts, which do not match in illustration, but corresponding parts are assigned the same reference numerals. The robot hand 108 is provided with a plate 109 connected with the flange 107. A first feature of the first embodiment is that a shock absorbing member 110 comprised of hard rubber, a metal spring, elastic plastic, etc. is interposed between the plate 109 and the flange 107. Therefore, even when the load torque or load force greatly changes in the robot hand 108, the shock-like inertia force occurring as a result will be absorbed by the shock absorbing member 110 and the shock will not be directly transmitted from the flange 107 to the shaft 106 and the drive mechanism of the robot body etc. Therefore, the drive mechanism etc. will be protected and a high accuracy of control can be maintained even without a particularly high rigidity. This shock-absorbing member 110 may for example be something like a rubber block or something like a coil spring.

The plate 109 supports a screwing work rotation drive unit 111. While not shown, the rotation drive unit 111 houses in it a motor, reduction gear, etc. The end of a rotation drive shaft 112 projected from the rotation drive unit 111 downward is formed integrally with a screwing work socket 113 or has such a separately fabricated part attached to it. The socket 113 in the first embodiment is bag-shaped and is provided with a hexagonal, duodecagonal, or otherwise shaped inside surface 15 matched with the shape of the nut 114 being driven at the time of screwing work (in general the "female screw member") for engagement with the same.

The robot base 101 has a plate-shaped pallet 116 placed on it. A second feature of the first embodiment is that the pallet 116 is not completely fixed to the robot base 101. Instead, a loose attaching means leaving a predetermined amount of range of movement (play), for example, a loose attaching means 117 comprised of a plurality of projections projecting from the robot base 101 side and large holes formed in the bottom surface of the pallet 116 so as to loosely receive these projections while leaving play of about 2 mm, is used to loosely engage the pallet 116 with the robot base 101. Due to this, the pallet 116 can freely rotate with respect to the robot base 101 by exactly a slight angle and can also shift slightly on the robot base 101 when engaging with the later mentioned relative rotation inhibiting mechanism.

A recess on the pallet 116 has placed in it a bolt (in general the "male screw member") 118, over which the above nut (in general the "female screw member") 114 is to be screwed, so as not to be able to rotate with respect to the pallet 116, but to be able to be easily attached and detached. In the first embodiment, as the means for affixing the bolt 118, a plurality of projections 119 formed at the pallet 16 are shown. These projections 119 are designed to fit into a plurality of holes formed at the bottom surface of the bolt 118. As the means for affixing the bolt 118, that is, part of the workpiece, it is also possible to use a means such as forming the recess at the pallet 116 side into a hexagonal shape or duodecagonal shape so as to engage with the head of the bolt 118 when the heat is hexagonal.

A third feature of the first embodiment is that at least two sharp tipped knock pins 120 project from the plate 109 downward. The knock pins 120 are designed to be able to be inserted into cylinders (in general the "holes") 121 provided at corresponding positions on the pallet 116. Due to this, not only is the socket 113 accurately positioned with the bolt 118 and nut 114, but also accompanying rotation of the pallet 116 and bolt 118 is inhibited when the screwing torque of the rotation drive shaft 112 for turning the nut 114 acts through the socket 113. Note that as a positioning-cum-relative rotation inhibiting mechanism 122, in the first embodiment, two or more knock pins and cylinders 121 for engagement with the same were used, but it is also possible for example to switch the two, that is, provide two or more knock pins 120 at the pallet 116 side and provide the cylinders 121 at the plate 109 side, or make various other modifications.

Next the operation of the robot system for screwing work of the first embodiment configured in this way will be explained. As shown in FIG. 2, a bolt 118 is placed at a predetermined position on the pallet 116 in advance by a separate robot hand or manually, a nut 114 is engaged with the top end of the bolt 118, then the first arm 104 is made to slide in the horizontal direction on the beam part 103 or the shaft 106 serving as the second arm is made to rotate or expand or contract so as to make the part of the robot hand 108 move to above the pallet 116, then descend. Due to this, the positioning-cum-relative rotation inhibiting mechanism 122 comprised of the knock pins 120 and the cylinders 121 engages, so the socket 113 is automatically positioned and reliably fits over the nut 114. Note that the attaching means 117 for the pallet 116 has slight play as explained above and the pallet 116 can move slightly on the robot base 101, so smooth engagement of the knock pins 120 to the cylinders 122 and accurate positioning and engagement of the socket 113 to the nut 114 become easy. The thus set state is shown in FIG. 3.

In this state, the not shown motor and reduction gear inside the rotation drive unit 111 are activated to drive the rotation of the nut ("female screw member") 114 through the rotation drive shaft 112 and socket 113. Due to this, the nut 114 is screwed over the bolt ("male screw member") 118 while rotating or some not shown member is fastened to the bolt 118. At this time, due to the action of the rotation drive shaft 112 rotating the nut 114, the bolt 118 and the pallet 116 supporting it also attempt to turn along with it, but since a play of about 2 mm is given between the projections and holes in the attaching means 117 of the pallet 116, before these contact and the torque of the drive shaft 112 is transmitted to the robot base 101, a reaction torque occurs at the relative rotation inhibiting mechanism 122 already engaged and the rotation of the pallet 116 is inhibited. Therefore, since the torque is not transmitted to the robot base 101 due to the play, the robot base 101 side, that is, the structure of the robot body side, is not liable to deform even if low in rigidity.

As shown as the closed broken line loop in FIG. 1, the screwing torque for rotating the nut 114 with respect to the bolt 118 is transmitted from the shaft of the not shown motor of the rotation drive unit 111 serving as the source of generation of the torque through the reduction gear, rotation driving shaft 112, socket 113, nut 114, bolt 118, pallet 116, and cylinders 121 and knock pins 120 of the relative rotation inhibiting mechanism 122 to the plate 109. The plate 109 supports the rotation drive unit 111 and therefore the housing of the motor housed inside it, so the torque is returned to the not shown motor. In this way, the path of transmission of the torque is closed in a loop inside the small robot hand 108, so the torque for fastening the nut 114 or the reaction torque will never leak to the outside of the robot hand 108.

Therefore, even if the shaft 10 serving as the second arm is thin or the first arm 104 or its support mechanism is small in rigidity, these parts are not liable to elastically deform due to the action of the screwing torque. Further, in the first embodiment, the flange 107 of the output end of the robot and the plate 109 of the robot hand 108 are provided between them with the shock absorbing member 110, so even if a shock-like inertia force occurs due to a sudden change in the screwing torque or load force in the robot hand 108, that shock force will be absorbed by the shock absorbing member 110, so will never be transmitted as it is to the drive mechanism etc. of the robot body through the flange 107 and the shaft 106. Therefore, even if the rigidity of the robot body is low, there is no fear of any problem such as a fall in the control accuracy arising due to the shock force.

In this way, even with high load work such as screwing work, the screwing torque or shock force etc. is never transmitted from the robot hand 108 to the robot body side, so reliable screwing work can be performed while maintaining a high accuracy even in a small-sized, not high rigidity inexpensive robot system like a tabletop robot. For example, even with a small sized tabletop robot of a rated load of 2 kgf, screwing work by a large torque of 10N·m becomes possible. Note that in the first embodiment, the bolt 118 is fixed while the nut 114 is turned, but of course this relationship can be reversed.

Next, a second embodiment of the present invention will be explained using FIGS. 4A to 4C to FIG. 13. First, what kind of workpiece is processed using the calking work and press-fitting work robot hands of the second embodiment and third embodiment of the present invention will be explained. FIGS. 4A to 4C show the workpiece. FIG. 4A shows the state before the calking work of the second embodiment where the two parts 1 and 3 to be joined by the calking work are simply put together. The two parts in the second embodiment are a cup-shaped member 1 made of metal and a generally cylindrical member 3 to be joined by calking work to a step 2 formed at the open part of the member 1. This assembly work may be performed by hand or performed using some sort of robot hand.

FIG. 4B shows the state after the calking work, therefore, the state before the next step, that is, the press-fitting work of the third embodiment. As clear from a comparison with FIG. 4A, since the opening part of the cup-shaped member 1 is formed with a step 2, the opening part has a thin part 4. In the calking work, the thin part 4 is bent inward so as to wrap around a flared part 5 formed at the bottom end of the cylindrical member 3 as shown in FIG. 4B. Due to this, a calked part 6 is formed affixing the cylindrical member 3 to the cup-shaped member 1.

FIG. 4C shows the state after a ring-shaped part 7 is press-fit by the press-fitting work into the open part at the top of the cylindrical member 3 joined integrally with the cup-shaped member 1 by the previous step of the calking work shown in FIG. 4B. In this case, of course the inside diameter of the open part of the top end of the cylindrical member 2 is made somewhat smaller than the outside diameter of the press-fitting part 7. Therefore, the semifinished part obtained as a result of the calking work in the second embodiment and the press-fitting work in the third embodiment becomes as shown in FIG. 4C.

Figure 5:
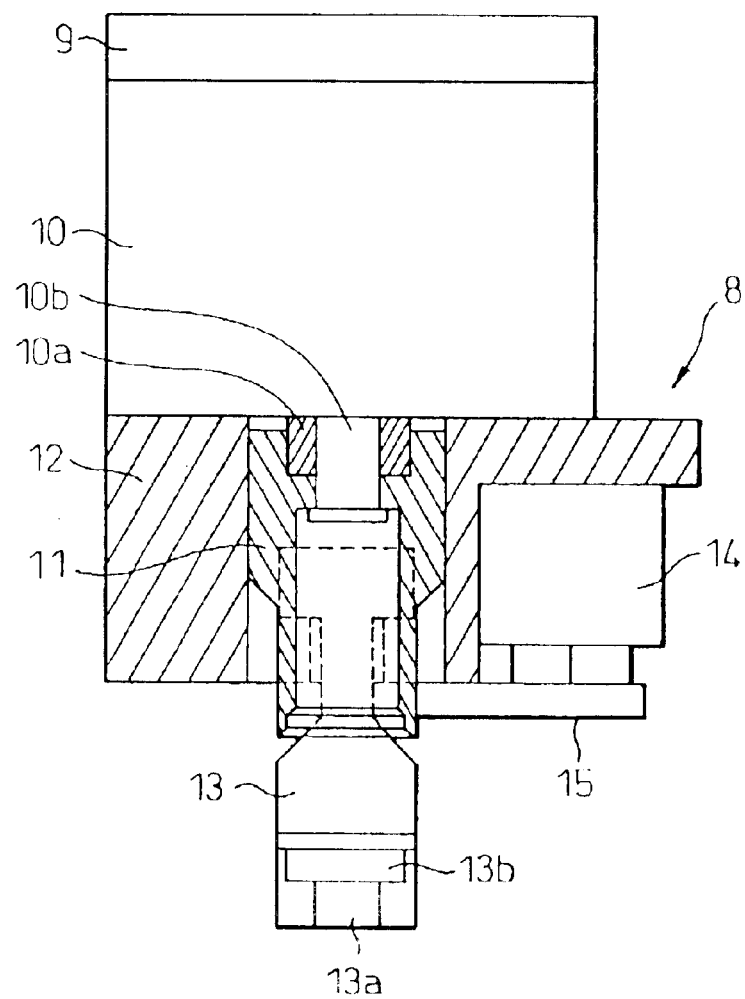
FIG. 5 is a longitudinal sectional side view illustrating the structure of a robot hand for calking work.
Figure 6:
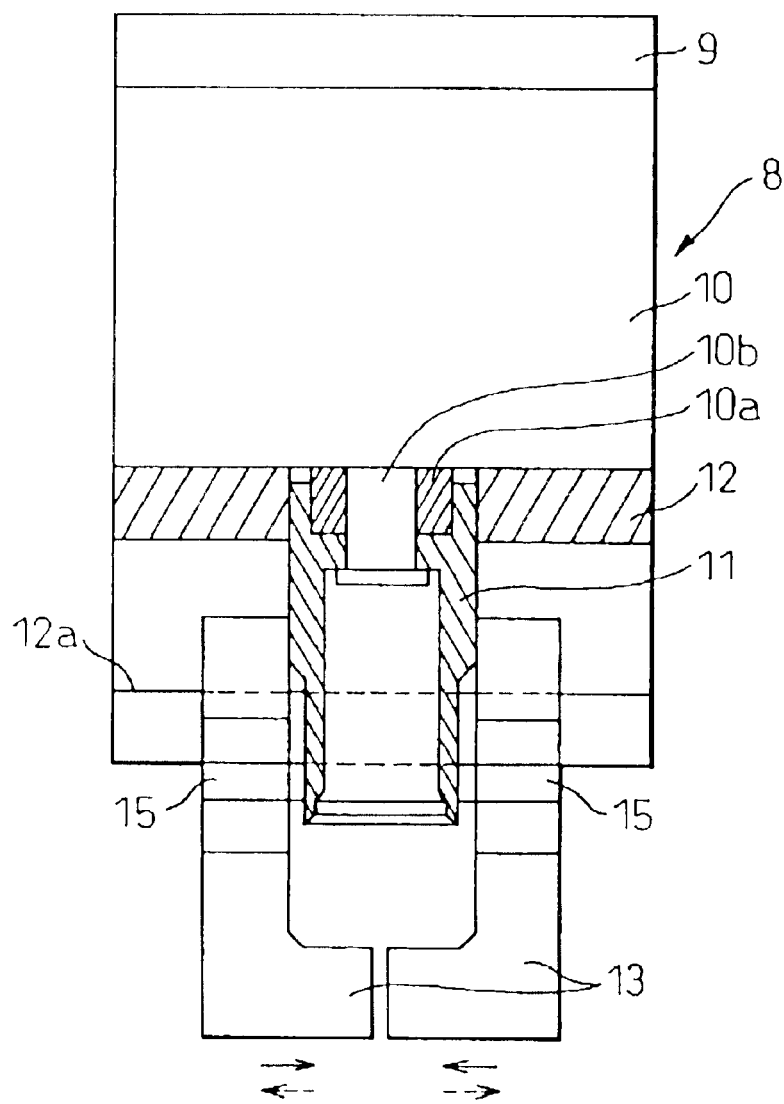
FIG. 6 is a longitudinal sectional front view of the robot hand shown in FIG. 5.
Figure 7:
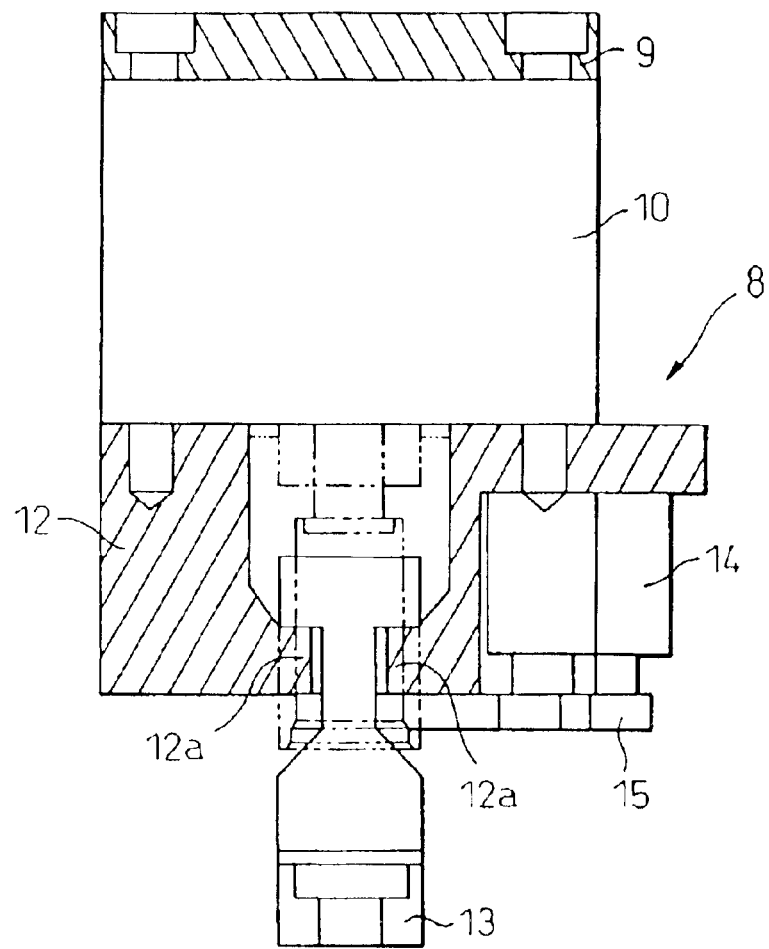
FIG. 7 is a side view of the robot hand shown in FIG. 5.

Next, the process of the calking work for changing the part from FIG. 4A to the semifinished part of FIG. 4B will be explained. A calking work robot hand 8 of the second embodiment attached for calking work to the flange of the output end of the later mentioned tabletop robot is shown in FIG. 5, FIG. 6, and FIG. 7. In these figures, reference numeral 9 is a plate (in general the "connecting part") attached to the flange provided at the front end of the robot arm of the robot body. Reference numeral 10 shows a casing part of the air cylinder (in general the "driving means"). The solid part of the air cylinder 10 is designed so to be able to withstand the supply of compressed air for making the generally cup-shaped calking punch 11 move up and down. Therefore, the output end 10a of the air cylinder 10 is integrally joined with the calking punch 11 by a bolt 10b screwed there.

Reference numeral 12 is a guide attached to the bottom of the air cylinder 10. It not only guides the calking punch 11 so as not to shift laterally at the time of vertical movement, but also guides the top parts of a pair of L-shaped grip parts (in general the "holding means") 13 such as shown in FIG. 6 when the grip parts 13 slide in the horizontal direction for opening or closing. Reference numeral 14 is an air chuck provided for operating the pair of grip parts 13 to open or close. While not shown, it is provided inside it with a small-sized air cylinder. The output ends, that is, two connecting plates 15, are connected with the pair of grip parts 13. As clear from FIG. 7, parts of the grip parts 13 are constricted. Parts of the guide 12 extend so as to engage with these constricted parts. As shown in FIG. 6, a pair of horizontal direction guide rails 12a is formed. Therefore, the grip parts 13 can slide in the horizontal direction along the guide rails 12a in opposite directions to open and close. Note that the front ends of the grip parts 13 are formed with grooves 13a or recesses 13b etc. so as to enable the workpiece to be reliably gripped.

Figure 8:
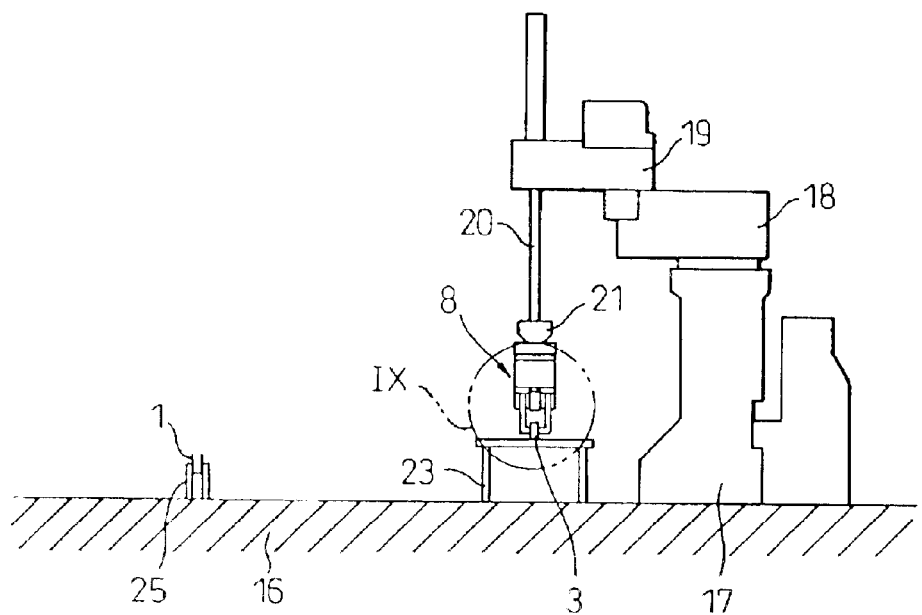
FIG. 8 is a conceptual view for explaining part-gripping work in calking work.

FIG. 8 schematically shows a small-sized tabletop robot used for assembly work of an auto part and, further in the present invention, calking work or press-fitting work as ancillary work of assembly work. In FIG. 8 and the later explained FIG. 10, FIG. 11, FIG. 16, FIG. 18, and FIG. 20, reference numeral 16 shows a robot base serving as the base for the entire robot system, 17 a robot body standing above the base 16, 18 a first arm able to swivel in the horizontal plane above the robot body 17, and 19 a second arm supported at the front end of the first arm 18 and further able to swivel in a horizontal plane. A shaft 20 extending from the front end of the second arm 19 toward the bottom may be called a third arm. The shaft 20 not only can rotate with respect to the second arm 19, but also can change in suspended length by expansion/contraction in its axial direction.

Reference numeral 21 shows a flange serving as the output end of the robot. The flange 21 forms the connecting part with the robot hand 8 for calking work of the second embodiment as shown in FIG. 5 to FIG. 7 or with the robot hand for press-fitting work explained in the later mentioned third embodiment. Note that the drive mechanism, control device, etc. for operating the flange 21 through the first arm 18, the second arm 19 and further the shaft 20 are housed inside the robot base 16, robot body 17, first arm 18, and second arm 19.

Figure 9:
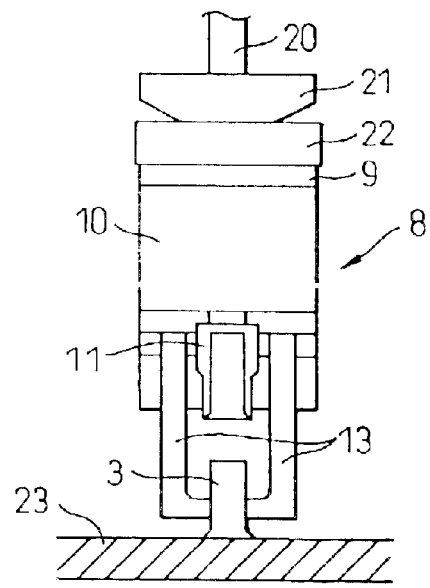
FIG. 9 is an enlarged view of a part IX of FIG. 8.

As shown by the enlarged key parts in FIG. 9, the plate 9 provided at the above-mentioned robot hand 8 is connected with the flange 21 of the output end of the robot body 17. At this time, one feature of the second embodiment is that the plate 9 and the flange 21 have interposed between them a shock absorbing member 22 comprised of hard rubber, a metal spring, elastic plastic, etc. Therefore, even when the load force or load torque changes greatly at the robot hand 8, the shock-like inertia force occurring as a result is absorbed by the shock-absorbing member 22 and the shock force is not directly transmitted from the flange 21 to the shaft 20 and the drive mechanism at the robot body 17 side etc. Therefore, not only is the drive mechanism etc. protected, but also a high accuracy of control can be held even if the rigidity of the structure at the robot body 17 side is not high. This shock-absorbing member 22 may for example be something like a rubber block or something like a coil spring.

Next, the routine for performing the preparatory work and calking work shown in FIGS. 4A and 4B by operating the calking work robot hand 8 in the second embodiment and the robot system mounting it configured as explained above will be explained. First, as shown in FIG. 8 and FIG. 9, the grip parts 13 of the robot hand 8 are operated to grip one assembly part, that is, the cylindrical member 3, placed at an assembly part repository 23. To ensure a reliable grip, as shown in FIG. 4 etc., the cylindrical member 3 is formed with an annular groove 24 in advance.

Figure 10:
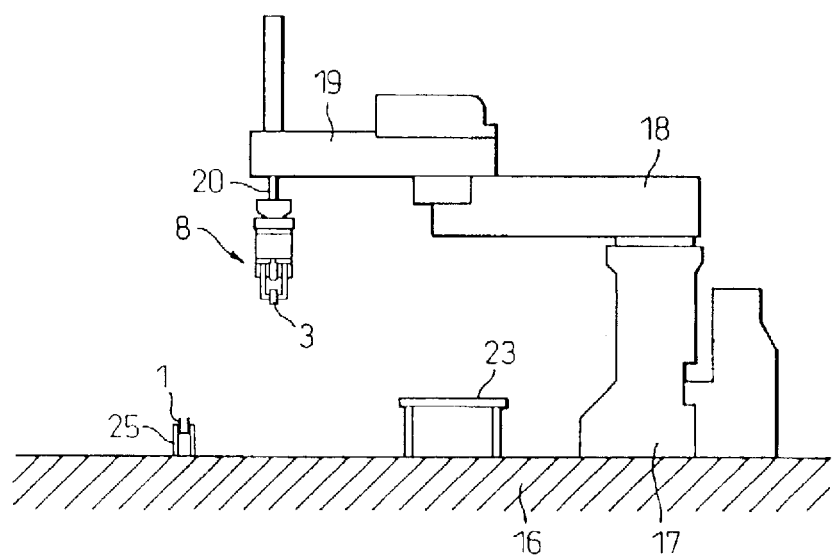
FIG. 10 is a conceptual view for explaining part transport work in calking work.
Figure 11:
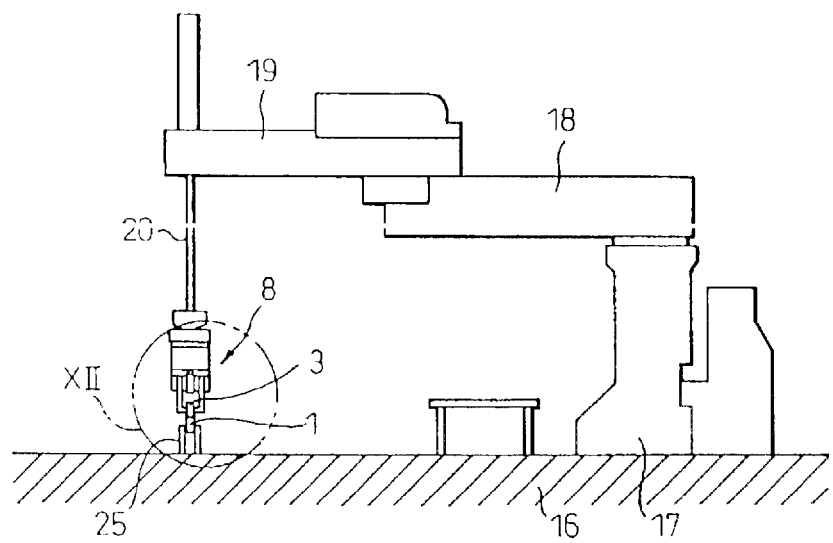
FIG. 11 is a conceptual view for explaining part assembly work in calking work.

Next, as shown in FIG. 10, the first arm 18 and the second arm 19 are made to swivel, the shaft 20 is made to contract, and the robot hand 8 gripping the cylindrical member 3 is transported to above the calking part repository 25 where the calking work is to be performed. The calking part repository 25 is provided in advance with a cup-shaped member 1 such as shown in FIG. 4 by hand or by a separate robot hand. Then, the shaft 20 is extended and the robot hand 8 is made to accurately descend to the position of the calking part repository 25, whereby the cylinder member 3 is placed above the cup-shaped member 1 as shown in FIG. 11. The key parts at this time are shown enlarged in FIG. 12. When placing the cup-shaped member 1 in advance at the top end of the cylinder calking part repository 25, it is necessary to provide not shown stoppers etc. at the part repository 25 so that the member 1 is stopped when inserted into the part repository 25 by exactly a predetermined depth. The state of the cylindrical member 3 placed on the cup-shaped member 1 in this way is the state of completion of pre-assembly shown in FIG. 4A.

If the air cylinder 10 shown in FIG. 5 and FIG. 6 were operated to cause the calking punch 11 to descend and perform the calking work in this state, the force of the calking punch 11 pushing down the cup-shaped member 1 would all act on the calking part repository 25, so not only would a large force act on the robot base 16 supporting the calking part repository 25, but also the reaction force would act on the robot hand 8, shaft 20, and, through the second arm 19 and the first arm 18, the robot body 17. Therefore, in a low rigidity tabletop robot etc., the robot arm or its support part etc. would elastically deform and the robot hand 8 would be difficult to reliably support, so normal calking work would no longer be able to be performed.

Figure 12:
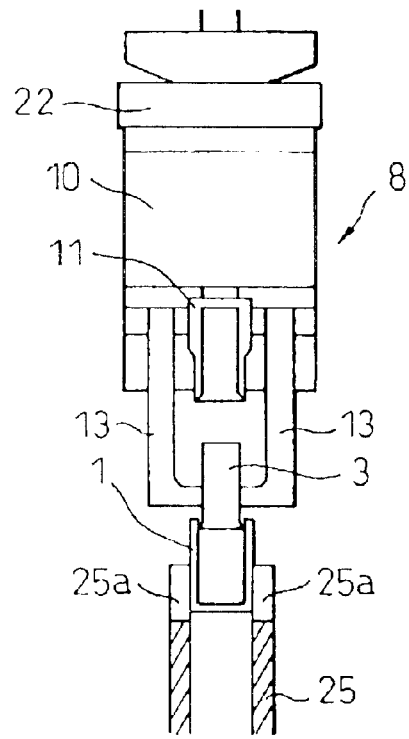
FIG. 12 is an enlarged view of a part XII of FIG. 11.
Figure 13:
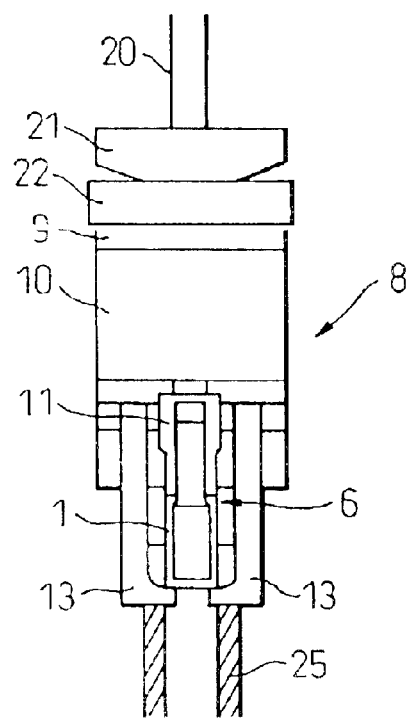
FIG. 13 is an enlarged view for explaining the features of calking work according to the present invention.

Therefore, in the second embodiment, as shown in FIG. 11 and FIG. 12, the cylindrical member 3 is placed on the cup-shaped member 1, then the grip parts 13 are opened to make hook-shaped tabs of the grip parts 13 engage with the bottom of the cup-shaped member 1. Further, as shown in FIG. 13, the air cylinder 10 is operated to press down the calking punch 11 while supporting the cup-shaped member 1 by the grip parts 13. The open part at the bottom of the calking punch 11 is provided with a tapered surface etc., so the thin part 4 of the cup-shaped member 1 is made to plastically deform to the inside so as to bend over the flared part 5 of the cylindrical member 3 and form the calking part 6 shown in FIG. 4B.

Due to this, the cup-shaped member 1 and the cylindrical member 3 are joined together and the step of the calking work is ended. The action force applied to the calking punch 11 by the air cylinder 10 at the time of the calking work returns to the guide 12 formed integrally with the air cylinder 10 through the grip parts 13 and the guide rail 12a etc. shown in FIG. 7, so the path of transmission of the action force of the calking work is kept inside the robot hand 8 and the force is canceled out by the reaction force. Therefore, the force will not leak to the outside of the robot hand 8 through the shaft 20 or the calking part repository 25. Therefore, even if the rigidity of the robot is not high, the robot arm etc. is not liable to elastically deform, so the calking work is performed normally and reliably. The shock force occurring along with the change in the action force is absorbed by the shock absorbing member 22, so will not have any detrimental effect on the robot body 17 side through the shaft 20. Note that the hook-like tabs of the grip parts 13 are made able to engage with the bottom of the cup-shaped member 1 by forming slits 25a etc. in the top of the cylindrical calking part repository 25.

Figure 14:
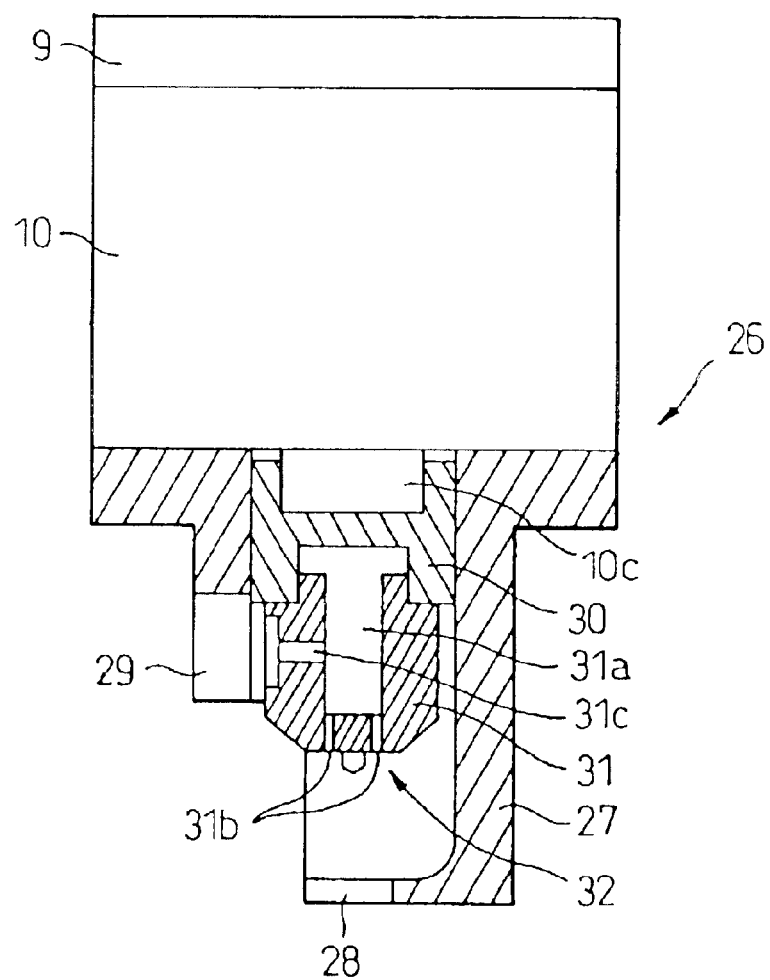
FIG. 14 is a longitudinal sectional side view illustrating the structure of a robot hand for press-fitting work.
Figure 15:
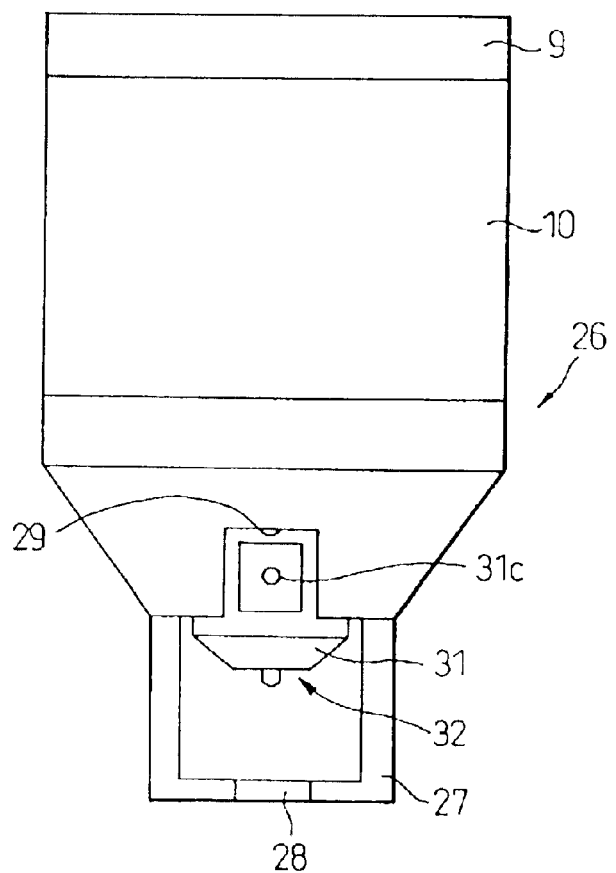
FIG. 15 is a front view of the robot hand shown in FIG. 14.

Next, the process of press-fitting work for changing the part from the state shown in FIG. 4B to the semifinished part of FIG. 4C will be explained as a third embodiment. A press-fitting work robot hand 26 of the third embodiment attached for press-fitting work to the flange 21 of the output end of the above-mentioned tabletop robot is shown in FIG. 14 and FIG. 15. Parts having substantially the same structure as in the calking work robot hand 8 explained in the second embodiment are assigned the same reference numerals and overlapping detailed explanations are omitted. In FIG. 14 and FIG. 15, a supporting part (in general the "holding means") 27 formed integrally with the air cylinder 10 at its top is a generally closed bottom cylindrical cup shape formed with a cutaway from the side to part of the bottom surface. Further, part of the bottom surface is formed with a U-shaped cutaway 28. The side is also formed with a cutaway 29.

The front-end 10c of the piston forming the output end of the air cylinder shown in FIG. 14 can press down the closed bottom cylindrical punch connected with its bottom through the sliding member 30 of the H-sectional shape. Therefore, the sliding member 30 is attached to the front end 10c of the piston of the air-cylinder 10 so as to enable it to slide in the vertical direction along the inside of the cylindrical shape of the supporting part 27. The bottom of the punch 31 is provided with at least one air hole 31b communicating the inside space 31a and the outside air. Further, the punch 31 is formed at its side with an exhaust port 31c communicating with the inside space 31a and is connected to a low-pressure source such as a vacuum pump by a not shown hose etc. The above-mentioned cutaway 29 is provided for the exhaust port 31c and hose. In this way, the bottom surface of the punch 31 forms the suction holding part 32 for holding and transporting a part to be press-fit.

Figure 16:
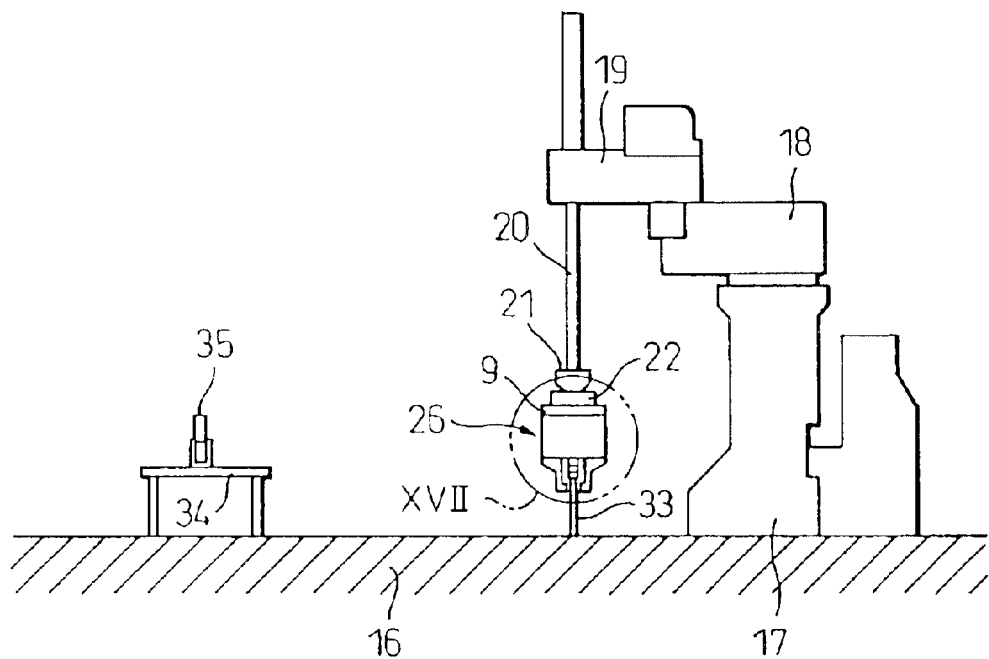
FIG. 16 is a conceptual view for explaining part suction holding work in press-fitting work.

The assembly robot used for driving the press-fitting work robot hand 26 may be the same as that for the above-mentioned calking work. Therefore, the plate 9 of the robot hand 26 also, in the same way as with the calking work robot hand 8, as shown in FIG. 16, is attached through a shock absorbing member 22 to the flange 21 attached to the front end of the shaft 20 supported by the arms 18 and 19 extending from the robot body 17.

Figure 17:
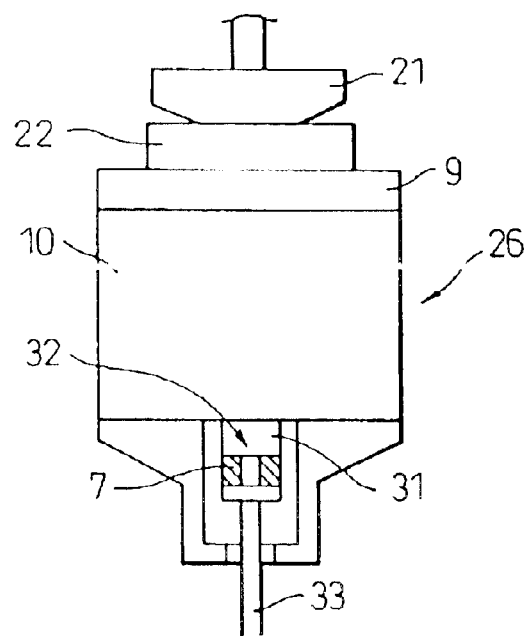
FIG. 17 is an enlarged view of the part XVII of FIG. 16.

Next, the routine for performing the press-fitting work shown in FIG. 4C while operating the robot hand of the third embodiment will be explained. First, as shown in FIG. 16 and FIG. 17, the robot hand 26 is made to move to and descend at the position of the press-fitting part repository 33, whereby, as shown in FIG. 17, one press-fitting part 7 is picked up by suction by the suction holding part 32 and held by suction at the bottom surface of the punch 31. Since vacuum suction holding is used, the press-fitting part 7 may be held by suction without any problem even if nonmagnetic or comprised of a plastic etc.

Figure 18:
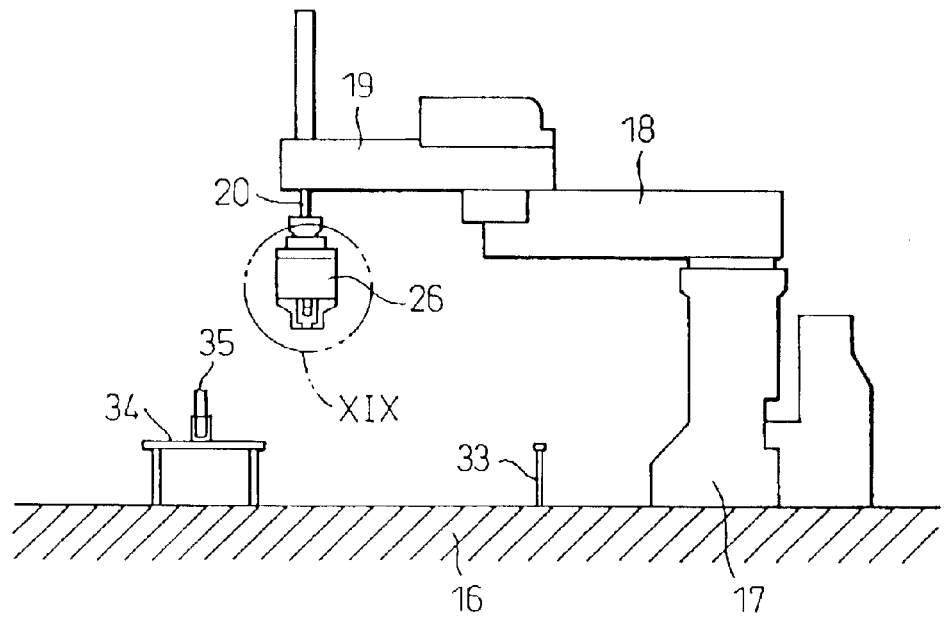
FIG. 18 is a conceptual view for explaining part transport work in press-fitting work.
Figure 19:
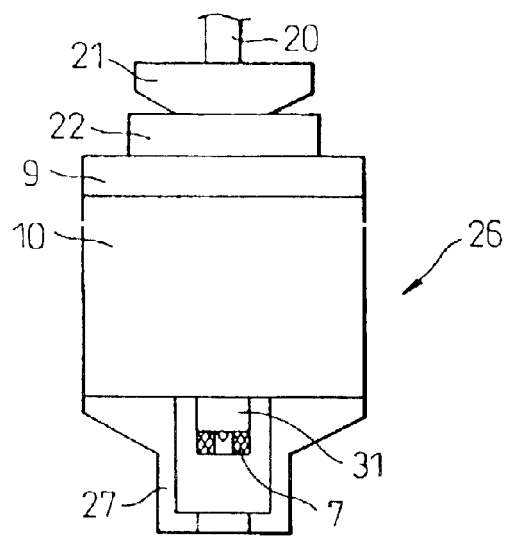
FIG. 19 is an enlarged view of the part XIX of FIG. 18.
Figure 20:
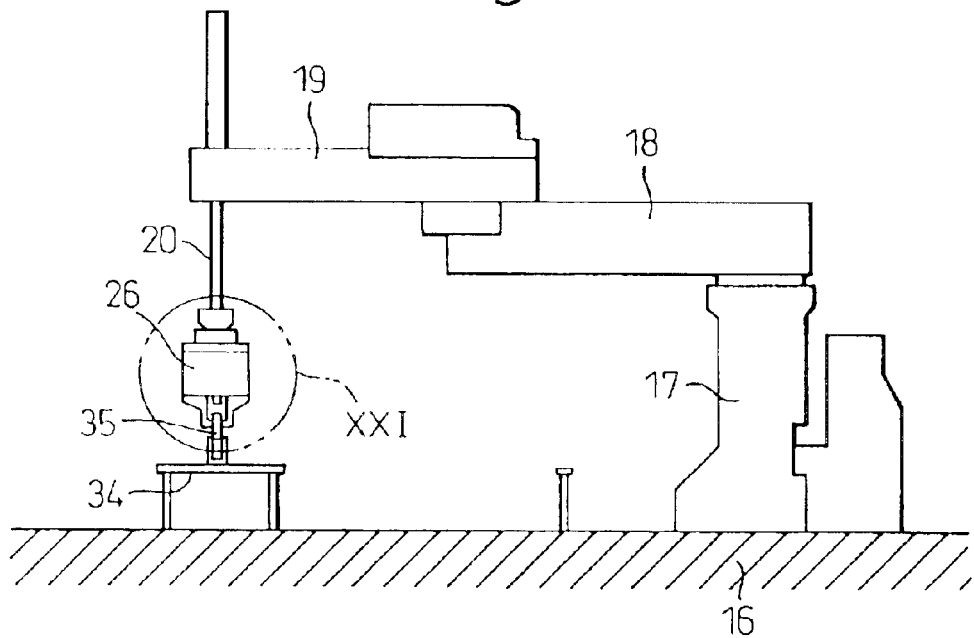
FIG. 20 is a conceptual view for explaining part-holding work in press-fitting work.

A press-fitted part repository 34 provided at a separate position on the robot base 16 holds a press-fitted part 35 as shown in FIG. 4B comprised of a cup-shaped member 1 calked with a cylindrical member 34 by the previous step of calking work. The robot hand 26 moves above the press-fitted part repository 34 in the state holding the press-fitting part 7 by suction. This state of transport is shown in FIG. 18 and its partially enlarged view given in FIG. 19.

Figure 21:
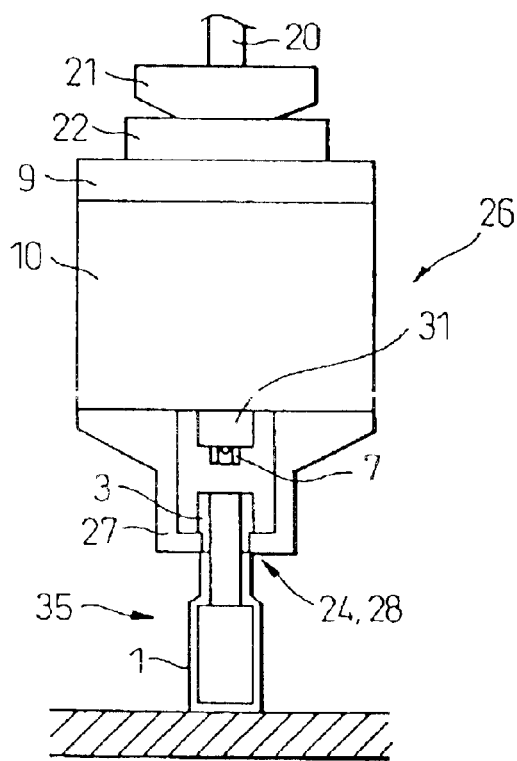
FIG. 21 is an enlarged view of the part XXI of FIG. 20.

The press-fitting work robot hand 26 moves close to and descends at the position of the press-fitted part repository 34, then moves slightly in the horizontal direction, whereby the U-shaped cutaway 28 of the supporting part 27 is engaged with the ring-shaped groove 24 formed in the press-fitted part 35 and shown in FIG. 4B. Due to this, the press-fitted part 35 is held by the supporting part 27 of the robot hand 26. This state is shown in the partially enlarged view given in FIG. 21. In this state, the press-fitting part 7 remains held by suction by the suction holding part 32 of the punch 31 and does not contact the press-fitted part 35.

Figure 22:
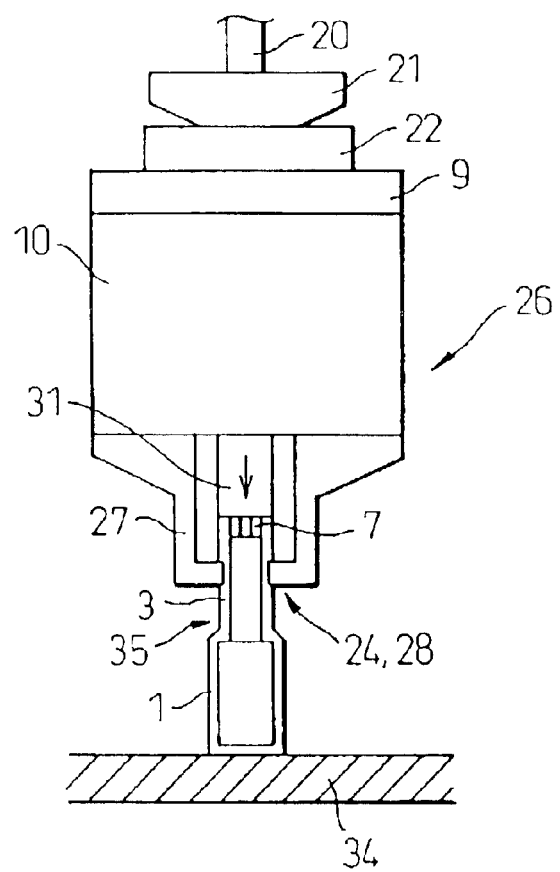
FIG. 22 is an enlarged view for explaining the features of press-fitting work according to the present invention.

After the press-fitted part 35 finishes being held by the support part 27, as shown in FIG. 22, the air cylinder 10 causes the punch 31 to descend under pressure, whereby the press-fitting part 7 is press-fit into the top opening of the cylinder member 3 forming part of the press-fitted part 35. The action force for press-fitting by the air cylinder 10 acting at this time passes through the press-fitting part 7 and the cylindrical member 3 to be returned from the support part 27 to the air cylinder 10, so will not act on the robot base 116 through the press-fitted part repository 34 or be transmitted through the shaft 20 or arms 18 and 19 to the robot body 17. That is, the path of transmission of the action force for the press-fitting work is kept inside the robot hand 26 and the force is canceled out by the reaction force, so will never leak to the outside from the robot hand 26.

Therefore, in the case of the press-fitting work of the third embodiment as well, in the same way as the calking work of the second embodiment, it is possible to avoid the problem of the action force for the press-fitting work elastically deforming part of the low rigidity structure of the robot, the accuracy of control of the position of the robot hand 26 falling, the structure no longer being able to withstand the large action force of the press-fitting, and normal press-fitting work no longer being able to be performed. Therefore, it becomes possible to perform press-fitting work as ancillary work of assembly work conducted by a small-sized tabletop robot.

Further, even which a shock force occurs due to a change in the action force applied at the time of press-fitting, since the flange 21 and the plate 9 of the robot hand 26 are provided with a shock absorbing member 22 between them, the shock force is absorbed and any detrimental effect on the robot body 17 etc. is avoided.

While the invention has been described with reference to specific embodiments chosen for purpose of illustration, it should be apparent that numerous modifications could be made thereto by those skilled in the art without departing from the basic concept and scope of the invention.

What is claimed is:

1. A robot hand for screwing work provided with:
   a rotation driving means driving rotation of one of a male screw member and female screw member for causing said screw members to engage,
   a supporting means connected with an end of a robot arm of a robot body for supporting said rotation driving means,
   a holding means for holding the other of said screw members at a predetermined position of said robot body, and
   a relative rotation inhibiting mechanism for connecting said supporting means and said holding means at the time of screwing and inhibiting relative rotation between the two.

2. A robot hand for screwing work as set forth in claim 1, further provided with a means for loosely attaching said holding means and a stationary part of said robot body facing the same.

3. A robot hand for screwing work as set forth in claim 2, wherein said loose attaching means is comprised of a plurality of projections provided at one of said holding means and a stationary part of said robot body and projecting out toward the other and a plurality of holes formed at the other of said holding means and stationary part of said robot body and loosely receiving said projections.

4. A robot hand for screwing work as set forth in claim 1, further provided with a shock absorbing means between the end of said robot arm and said supporting means.

5. A robot hand for screwing work as set forth in claim 4, wherein said shock absorbing means is comprised of elastic rubber.

6. A robot hand for screwing work as set forth in claim 4, wherein said shock absorbing means is comprised of a spring.

7. A robot hand for screwing work as set forth in claim 1, wherein said relative rotation inhibiting mechanism is comprised of a plurality of pins provided at one of said supporting means and said holding means and projecting toward the other and a plurality of holes provided at the other of said supporting means and said holding means and receiving said pins.

8. A robot hand for screwing work as set forth in claim 1, wherein an assembly use tabletop robot is used as said robot body.

* * * * *